United States Patent
Gao et al.

(10) Patent No.: US 10,247,859 B2
(45) Date of Patent: Apr. 2, 2019

(54) DISPLAY PANEL AND DISPLAY DEVICE

(71) Applicant: BOE TECHNOLOGY GROUP CO., LTD., Beijing (CN)

(72) Inventors: Jian Gao, Beijing (CN); Xiaochuan Chen, Beijing (CN); Yafeng Yang, Beijing (CN); Jifeng Tan, Beijing (CN); Pengcheng Lu, Beijing (CN); Qian Wang, Beijing (CN); Can Zhang, Beijing (CN); Can Wang, Beijing (CN); Xinli Ma, Beijing (CN); Wei Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/554,511

(22) PCT Filed: Feb. 20, 2017

(86) PCT No.: PCT/CN2017/074119
§ 371 (c)(1),
(2) Date: Aug. 30, 2017

(87) PCT Pub. No.: WO2017/202080
PCT Pub. Date: Nov. 30, 2017

(65) Prior Publication Data
US 2018/0164472 A1 Jun. 14, 2018

(30) Foreign Application Priority Data

May 25, 2016 (CN) .......................... 2016 1 0353740

(51) Int. Cl.
*G02B 3/00* (2006.01)
*G02F 1/1335* (2006.01)
*G09F 9/30* (2006.01)

(52) U.S. Cl.
CPC .......... *G02B 3/0056* (2013.01); *G02B 3/0043* (2013.01); *G02F 1/1335* (2013.01); *G02F 1/133526* (2013.01); *G09F 9/30* (2013.01)

(58) Field of Classification Search
CPC .. G02B 3/0056; G02B 3/0062; G02B 3/0068; G02B 27/0961; G02B 27/2214; G02F 1/0311; G02F 1/133526; G02F 2001/3503
(Continued)

(56) References Cited

U.S. PATENT DOCUMENTS 5,439,621 A * 8/1995 Hoopman ........ B29D 11/00278
264/1.7
6,215,593 B1 * 4/2001 Bruce ...................... G02B 6/08
359/619

(Continued)

FOREIGN PATENT DOCUMENTS

CN 104464523 A 3/2015
CN 104575322 A 4/2015
(Continued)

OTHER PUBLICATIONS

First Office Action for Chinese Patent Application No. 201610353740.2 dated Dec. 18, 2017.
(Continued)

*Primary Examiner* — Frank G Font
(74) *Attorney, Agent, or Firm* — Calfee, Halter & Griswold LLP

(57) ABSTRACT

A virtual curved surface display panel and a display device are provided. The virtual curved surface display panel includes a flat display panel having a plurality of pixels arranged in a matrix, and an array of convex lenses arranged on a light exit surface of the flat display panel. The array of convex lenses makes a track of image distances of the pixels form a curved surface. By adjusting the focal lengths of the
(Continued)

lenses, the image distances of the pixels in the flat display panel can be various. The images of the pixels are then distributed on a curved surface. A visual effect of a virtual curved surface can be achieved with a flat display panel, improving the effect of visual impact.

17 Claims, 7 Drawing Sheets

(58) Field of Classification Search
USPC .............. 359/648, 741, 743, 754, 793, 794; 349/57, 95
See application file for complete search history.

(56) References Cited

U.S. PATENT DOCUMENTS

| | | | | |
|---|---|---|---|---|
| 6,339,506 | B1* | 1/2002 | Wakelin | G02B 27/0025 |
| | | | | 359/626 |
| 8,794,770 | B2* | 8/2014 | Sieler | G02B 27/0101 |
| | | | | 353/102 |
| 9,880,325 | B2* | 1/2018 | Lanman | G02B 3/0006 |
| 2002/0047837 | A1 | 4/2002 | Suyama et al. | |
| 2002/0085287 | A1* | 7/2002 | Egawa | G02B 3/005 |
| | | | | 359/619 |
| 2006/0023314 | A1* | 2/2006 | Boettiger | G02B 3/0018 |
| | | | | 359/621 |
| 2009/0033812 | A1* | 2/2009 | Ijzerman | G02B 27/2214 |
| | | | | 349/15 |
| 2009/0052026 | A1* | 2/2009 | Takagi | G02B 27/2214 |
| | | | | 359/463 |
| 2011/0279751 | A1 | 11/2011 | Iiyama et al. | |
| 2012/0050562 | A1* | 3/2012 | Perwass | H04N 5/2254 |
| | | | | 348/222.1 |
| 2013/0021226 | A1* | 1/2013 | Bell | G02B 3/0006 |
| | | | | 345/8 |
| 2013/0234009 | A1* | 9/2013 | Guldimann | G01J 3/02 |
| | | | | 250/227.2 |
| 2015/0288861 | A1* | 10/2015 | Duparre | H04N 5/3696 |
| | | | | 348/218.1 |
| 2016/0187745 | A1 | 6/2016 | Jin | |
| 2016/0195646 | A1 | 7/2016 | Su et al. | |
| 2016/0238894 | A1* | 8/2016 | Choi | G02F 1/133603 |
| 2017/0147034 | A1* | 5/2017 | Lanman | G06F 1/163 |
| 2018/0081090 | A1* | 3/2018 | Duparre | H04N 17/002 |

FOREIGN PATENT DOCUMENTS

| | | |
|---|---|---|
| CN | 105807481 A | 7/2016 |
| CN | 10842905 A | 8/2016 |
| CN | 205787479 U | 12/2016 |

OTHER PUBLICATIONS

Search Report for International Patent Application No. PCT/CN2017/074119 dated May 22, 2017.

* cited by examiner

DISPLAY PANEL AND DISPLAY DEVICE

RELATED APPLICATIONS

The present application is the U.S. national phase entry of the international application PCT/CN2017/074119, with an international filing date of Feb. 20, 2017, which claims the benefit of Chinese Patent Application No. 201610353740.2, filed on May 25, 2016, the entire disclosures of which are incorporated herein by reference.

TECHNICAL FIELD

The present disclosure relates to the field of display technology, and more particularly to a display panel and a display device.

BACKGROUND

At present, the flat display panel is widely used due to its advantage of saving physical space. However, with the increase of the viewing angle, the light intensity is gradually weakened, providing a bad viewing angle experience for the human eye. Especially for the large-scale display, this effect is more significant. The surround effect of the curved surface display can enhance the impact of viewing effects for the viewer, but the drawback is that the physical curving process is very difficult and the device is thick and heavy.

SUMMARY

Therefore, providing a visual effect of a virtual curved surface using a flat display panel is the focus of research.

To this end, the embodiments of the present disclosure provide a display panel and a display device, which provide a visual effect of a virtual curved surface with a flat display panel.

An embodiment of the present disclosure provides a display panel that includes: a flat display panel having a plurality of pixels arranged in a matrix, and an array of convex lenses arranged on a light exit surface of the flat display panel. The convex lenses in the array are configured for imaging the plurality of pixels, such that a trajectory of images of the pixels forms a curved surface.

In an exemplary embodiment, in the display panel provided by the present disclosure, the array of convex lenses includes a plurality of convex lenses arranged in an array. Focal lengths of the convex lenses are symmetrically distributed with respect to a vertical central symmetrical axis of the light exit surface. The focal lengths of the convex lenses having the same distance from the vertical central symmetrical axis are the same.

In an exemplary embodiment, in the display panel provided by the present disclosure, an object distance between the array of convex lenses and the flat display panel is smaller than the focal lengths of the convex lenses, and the focal length of the convex lens increases with the increase of the distance between the convex lens and the vertical central symmetrical axis. Alternatively, an object distance between the array of convex lenses and the flat display panel is larger than the focal lengths of the convex lenses, and the focal length of the convex lens increases with the increase of the distance between the convex lens and the vertical central symmetrical axis.

In an exemplary embodiment, in the display panel provided by the present disclosure, the pixels in the flat display panel are in one-to-one correspondence with the convex lenses in the array of convex lenses.

In an exemplary embodiment, in the display panel provided by the present disclosure, an object distance between the array of convex lenses and the flat display panel is smaller than the focal lengths of the convex lenses. In a direction perpendicular to the vertical central symmetrical axis, a ratio of a width of the pixel to a width of a black matrix next to the pixel increases with the increase of the distance between the convex lens and the vertical central symmetrical axis. Alternatively, an object distance between the array of convex lenses and the flat display panel is larger than the focal lengths of the convex lenses. In a direction perpendicular to the vertical central symmetrical axis, a ratio of a width of the pixel to a width of a black matrix next to the pixel decreases with the increase of the distance between the convex lens and the vertical central symmetrical axis.

In an exemplary embodiment, in the display panel provided by the present disclosure, the object distance between the array of convex lenses and the flat display panel is smaller than the focal lengths of the convex lenses. In a direction perpendicular to the vertical central symmetrical axis, the width of the pixel increases with the increase of the distance between the convex lens and the vertical central symmetrical axis. Alternatively, the object distance between the array of convex lenses and the flat display panel is larger than the focal lengths of the convex lenses. In a direction perpendicular to the vertical central symmetrical axis, the width of the pixel decreases with the increase of the distance between the convex lens and the vertical central symmetrical axis.

In an exemplary embodiment, in the display panel provided by the present disclosure, the object distance between the array of convex lenses and the flat display panel is smaller than the focal lengths of the convex lenses. In a direction perpendicular to the vertical central symmetrical axis, the width of the black matrix between the pixels decreases with the increase of the distance between the convex lens and the vertical central symmetrical axis. Alternatively, the object distance between the array of convex lenses and the flat display panel is larger than the focal lengths of the convex lenses. In a direction perpendicular to the vertical central symmetrical axis, the width of the black matrix between the pixels increases with the increase of the distance between the convex lens and the vertical central symmetrical axis.

In an exemplary embodiment, in the display panel provided by the present disclosure, each convex lens includes a plurality of sub-convex lenses having the same focal length, and the plurality of sub-convex lenses are in one-to-one correspondence with a plurality of sub-pixels constituting the pixel.

In an exemplary embodiment, in the display panel provided by the present disclosure, a plurality of sub-pixels constituting the pixel in the flat display panel are in one-to-one correspondence with the convex lenses in the array of convex lenses.

In an exemplary embodiment, in the display panel provided by the present disclosure, the convex lens is a planoconvex lens.

In an exemplary embodiment, in the display panel provided by the present disclosure, a convex surface of each planoconvex lens is away from the light exit surface of the flat display panel.

In an exemplary embodiment, in the display panel provided by the present disclosure, the planoconvex lens is a cylindrical convex lens or a circular convex lens.

In an exemplary embodiment, in the display panel provided by the present disclosure, the planoconvex lenses are arranged closely with each other and have the same aperture.

In an exemplary embodiment, in the display panel provided by the present disclosure, the flat display panel is a liquid crystal display panel, an electroluminescence display panel, a plasma display panel or an electronic paper.

An embodiment of the present disclosure further provides a display panel. The display panel includes: a flat display panel having a plurality of pixels arranged in a matrix, and an array of convex lenses arranged on a light exit surface of the flat display panel. The convex lenses in the array are configured for imaging the plurality of pixels, such that a trajectory of images of the pixels forms a curved surface. The array of convex lenses includes a plurality of convex lenses arranged in an array. Focal lengths of the convex lenses are symmetrically distributed with respect to a center of the light exit surface.

In an exemplary embodiment, in the display panel provided by the present disclosure, an object distance between the array of convex lenses and the flat display panel is smaller than the focal lengths of the convex lenses, and the focal length of the convex lens increases with the increase of the distance between the convex lens and the center. Alternatively, an object distance between the array of convex lenses and the flat display panel is larger than the focal lengths of the convex lenses, and the focal length of the convex lens increases with the increase of the distance between the convex lens and the center.

An embodiment of the disclosure further provides a display device. The display device includes the display panel according to the abovementioned embodiments.

In the display panel provided by the embodiment of the present disclosure, the array of convex lenses is arranged on the light exit surface of the flat display panel, and the imaging principle of the convex lens is applied. The focal lengths of the convex lenses are symmetrically distributed with respect to a center or a vertical central symmetrical axis of the light exit surface. By adjusting the focal lengths of the lenses, the image distances of the pixels in the flat display panel can be various. The images of the pixels are then distributed on a curved surface. A visual effect of a virtual curved surface can be achieved with a flat display panel, improving the effect of visual impact.

DETAILED DESCRIPTION OF THE DISCLOSURE

Figure 1A:
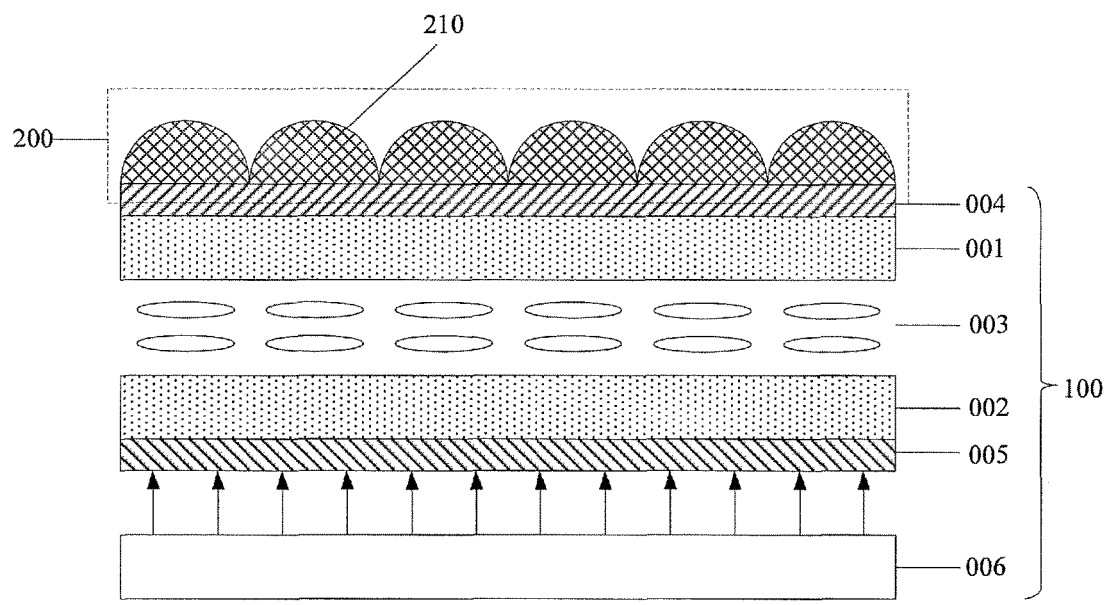
FIG. 1a is a structural schematic diagram of a display panel according to an embodiment of the disclosure.

In the following, with reference to the accompanying drawings, the exemplary embodiments of the display panel and display device provided by the present disclosure will be described in detail.

The shapes and sizes of the components in the drawings do not reflect the real scale of the display panel, but to schematically illustrate the embodiments of the disclosure.

Figure 1B:
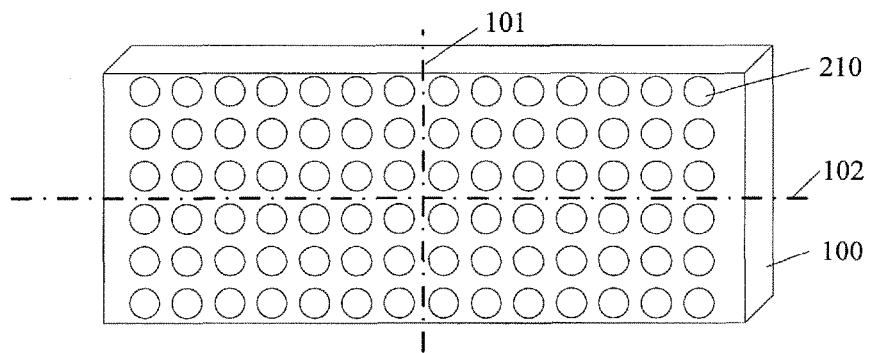
FIG. 1b is a structural schematic diagram of a display panel according to an embodiment of the disclosure.

An embodiment of the disclosure provides a display panel. As shown in FIG. 1a and FIG. 1b, the display panel includes: a flat display panel 100 having a plurality of pixels arranged in a matrix, and an array of convex lenses 200 arranged on a light exit surface of the flat display panel 100. The array of convex lenses 200 images the plurality of pixels, so that a trajectory of images of the pixels forms a curved surface.

In an exemplary embodiment, in the display panel provided by the present disclosure, the array of convex lenses 200 includes a plurality of convex lenses 210 arranged in an array. Focal lengths of the convex lenses 210 are symmetrically distributed with respect to a vertical central symmetrical axis 101 of the light exit surface. The focal lengths of the convex lenses 210 having the same distance from the vertical central symmetrical axis 101 are the same. With such a configuration, a completely symmetrical curved surface display effect can be achieved.

Those skilled in the art will appreciate that the flat display panel 100 can further include a horizontal symmetrical axis 102 perpendicular to the vertical central symmetrical axis 101. In some embodiments, the virtual curved display panel can further be arranged as: with respect to the horizontal central symmetrical axis 102, the focal lengths of the convex lenses 210 are symmetrically distributed, and the focal lengths of the convex lenses 210 having the same distance from the horizontal central symmetrical axis 102 are the same.

In the context of the present disclosure, the vertical central symmetrical axis or the horizontal central symmetrical axis refers to a symmetrical axis parallel to an edge of the light exit surface and passing through the center of the light exit surface. Since the vertical central symmetrical axis and the horizontal central symmetrical axis are interchangeable, for convenience of description, in the following embodiments, the vertical central symmetrical axis or the horizontal central symmetrical axis is simply referred to as "central symmetrical axis".

In an exemplary embodiment, in the display panel provided by the present disclosure, the type of the flat display panel 100 is not limited. The flat display panel 100 can be a liquid crystal display panel, an electroluminescence display panel, a plasma display panel or an electronic paper. For example, in FIG. 1a, the flat display panel 100 is a liquid crystal display panel. The liquid crystal display panel 100 includes: an upper substrate 001 and a lower substrate 002 arranged oppositely, a liquid crystal layer 003 arranged between the upper substrate 001 and the lower substrate 002, an upper polarizer 004 attached on the top of the upper substrate 001, a lower polarizer 005 attached on the bottom of the lower substrate 002, and a backlight module 006 disposed below the lower polarizer 005. The light exit surface of the liquid crystal display panel is on the side of the upper polarizer 004. An array of convex lenses is arranged on the top of the upper polarizer 004. Light emitted from the backlight module 006 is modulated by the liquid crystal layer 003 and exits from the side of the upper polarizer 004, and images are then formed by refraction of the convex lenses 210 having different focal lengths.

Figure 1C:
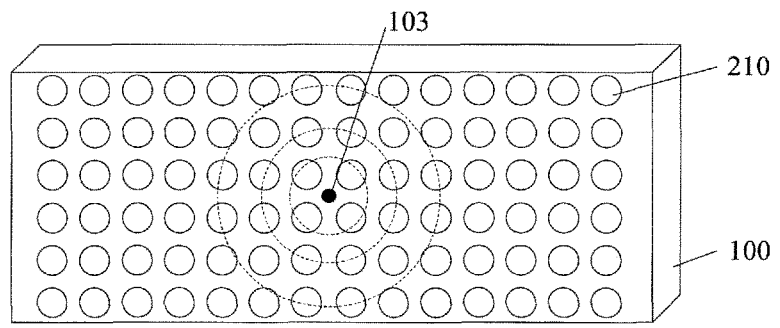
FIG. 1c is a structural schematic diagram of a display panel according to another embodiment of the disclosure.

Based on the same principle, an embodiment of the present disclosure further provides a display panel. As shown in FIG. 1c, the display panel includes: a flat display panel 100 having a plurality of pixels arranged in a matrix, and an array of convex lenses arranged on a light exit surface of the flat display panel. The array of convex lenses images the plurality of pixels, to that a trajectory of images of the pixels forms a curved surface. The array of convex lenses includes a plurality of convex lenses 210 arranged in an array. The focal lengths of the convex lenses 210 are symmetrically distributed with respect to a center 103 of the light exit surface. With such a configuration, the display panel provides a display effect of spherical screen, which is very advantageous for large-sized display devices.

In an exemplary embodiment, in the display panel provided by the present disclosure, an object distance between the array of convex lenses and the flat display panel 100 is smaller than the focal lengths of the convex lenses, and the focal length of the convex lens 210 increases with the increase of the distance between the convex lens 210 and the center 103. Alternatively, an object distance between the array of convex lenses and the flat display panel 100 is larger than the focal lengths of the convex lenses 210, and the focal length of the convex lens 210 increases with the increase of the distance between the convex lens 210 and the center 103.

In the display panel provided by the embodiment of the present disclosure, the array of convex lenses is arranged on the light exit surface of the flat display panel, and the imaging principle of the convex lens is applied. The focal lengths of the convex lenses are symmetrically distributed with respect to a center or a vertical central symmetrical axis of the light exit surface. By adjusting the focal lengths of the lenses, the image distances of the pixels in the flat display panel can be varied. The images of the pixels are then distributed on a curved surface. A visual effect of a virtual curved surface can be achieved with a flat display panel, improving the effect of visual impact.

Figure 2A:
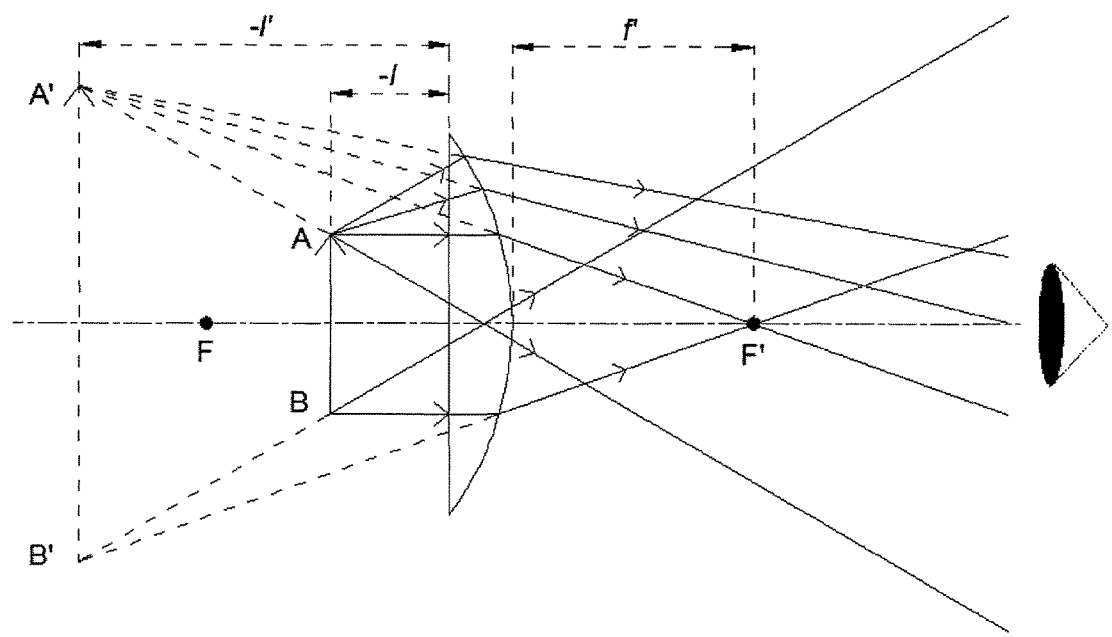
FIG. 2a is a schematic diagram showing the display principle of a virtual image formed by a convex lens.

In particular, in the display panel provided by the embodiment of the present disclosure, as shown in FIG. 2a, the display principle of a virtual image formed by a convex lens is applied. An object AB is placed in the object distance 1 smaller than the focal length f'. Thus, a magnified virtual image A'B' of the object AB can be formed and received by the human eye, thereby realizing a display effect of a curved surface behind the flat display panel 100.

The basic formulas of optical system are given below.
1. The relationship between the object and image:

$$\frac{1}{l'} - \frac{1}{l} = \frac{1}{f'} \quad (1)$$

2. The focal length of the planoconvex lens:

$$f' = \frac{r}{n-1} \quad (2)$$

3. The lateral magnification:

$$\beta = \frac{l'}{l} \quad (3)$$

In the above formula (1), parameter f' is a positive value for the convex lens, the image distance 1' is a positive value when a real image of the object is created. In case a virtual image is formed by the convex lens, the image distance 1' is a negative value.

From the basic formulas of optical system it can be seen that, if the object distance 1 is constant, the convex lenses having different focal lengths f' correspond to different image distances 1'. With such a property, the focal lengths of the convex lenses 210 in the lens array 200 shown in FIG. 3a can be arranged as: the object distance 1 between the array of convex lenses and the flat display panel 100 is smaller than the focal lengths f' of the convex lenses 210, and the focal length f' of the convex lens 210 gradually increases with the increase of the distance between the convex lens 210 and the central symmetrical axis. That is, in FIG. 3a the convex lens with a focal length $f_0$ is on the central symmetrical axis, and $f_0<f_1<f_2$. Rear virtual images thus can be obtained by using the convex lens array 200, and all the virtual images are located on a curved surface, thereby realizing a display effect of a curved surface behind the flat display panel 100.

Figure 2B:
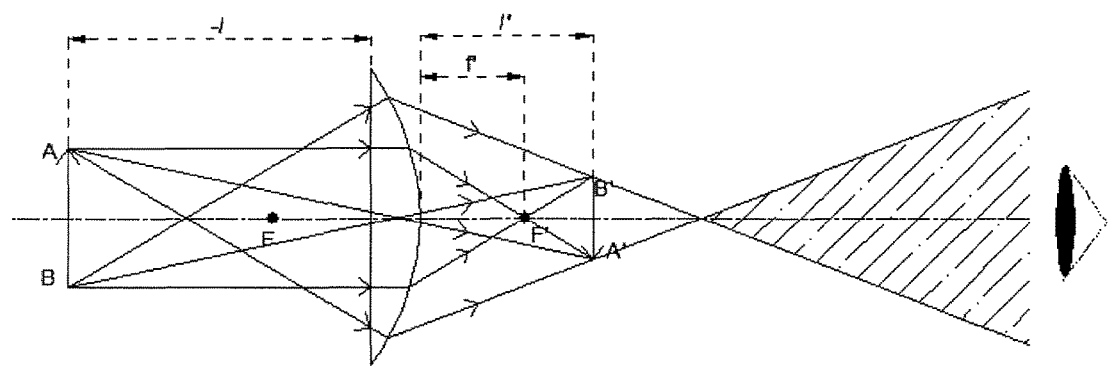
FIG. 2b is a schematic diagram showing the display principle of a real image formed by a convex lens.

In particular, in the display panel provided by the embodiment of the present disclosure, as shown in FIG. 2b, the display principle of a real image formed by a convex lens is applied. An object AB is placed in the object distance 1 larger than the focal length f'. Thus, a magnified or reduced real image A'B' of the object AB can be formed and received by the human eye, thereby realizing a display effect of a curved surface in front of the flat display panel 100.

From the basic formulas of optical system it can be seen that, if the object distance 1 is constant, the convex lenses having different focal lengths f' correspond to different image distances 1'. With such a property, the focal lengths of the convex lenses 210 in the lens array 200 shown in FIG. 3b can be arranged as: the object distance 1 between the array of convex lenses and the flat display panel 100 is larger than the focal lengths f' of the convex lenses 210, and the focal length f' of the convex lens 210 gradually increases with the increase of the distance between the convex lens 210 and the central symmetrical axis. That is, in FIG. 3b the convex lens with a focal length $f_0$ is on the central symmetrical axis, and $f_2>f_1>f_0$. Front real images thus can be obtained by using the convex lens array 200, and all the real images are located on a curved surface, thereby realizing a display effect of a curved surface in front of the flat display panel 100.

Figure 3A:
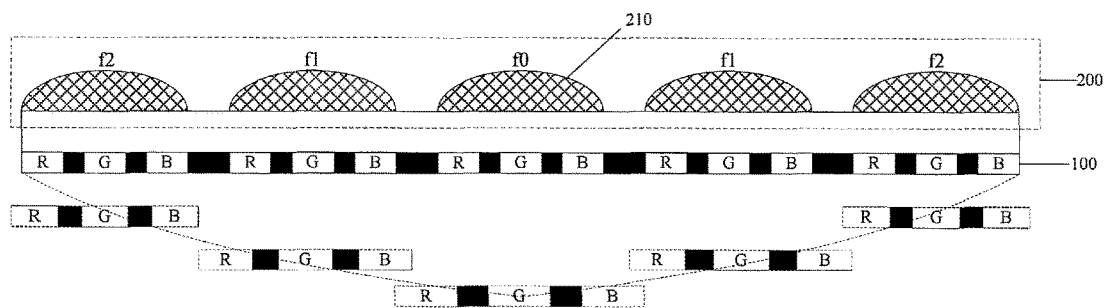
FIG. 3a is a structural schematic diagram of a display panel realizing rear curved surface display according to an embodiment of the disclosure.
Figure 3B:
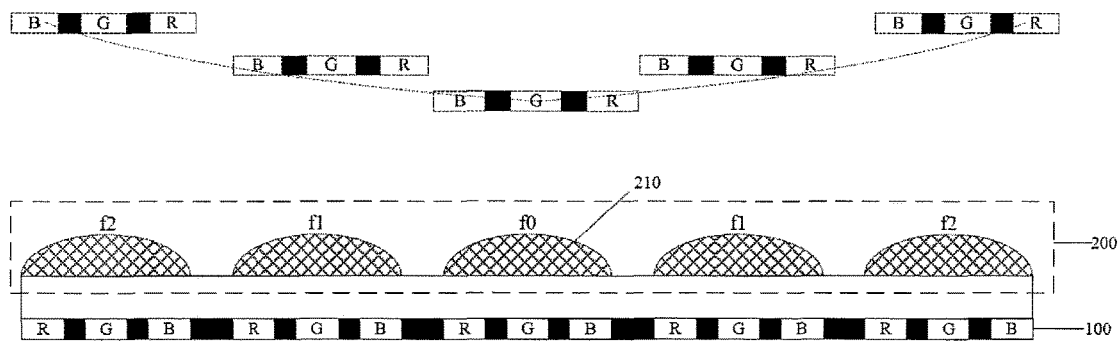
FIG. 3b is a structural schematic diagram of a display panel realizing front curved surface display according to an embodiment of the disclosure.

In an exemplary embodiment, in the display panel provided by the present disclosure, no matter the display principle of a virtual image formed by a convex lens or the display principle of a real image formed by a convex lens is applied, the following mode can be used in arranging the relationship between the convex lenses 210 in the convex lens array 200 and the pixels in the flat display panel 100: the pixels RGB in the flat display panel 100 are in one-to-one correspondence with the convex lenses 210 in the array of convex lenses 200, i.e., one convex lens 210 corresponds to one pixel RGB. In this situation, as shown in FIG. 3a and FIG. 3b, for the virtual images or real images, the magnified images of the pixels RGB may overlap with each other, and this may cause distortion for the image quality of the display panel. Based on this, the following three modes can be applied to eliminate the phenomenon of overlapping images and solve the problem of image quality distortion.

Mode 1: changing the ratio of the width of the pixel to a width of a black matrix next to the pixel in a direction perpendicular to the central symmetrical axis. As shown in FIG. 3a, the object distance l between the convex lens array 200 and the flat display panel 100 is smaller than the focal lengths f' of the convex lenses 210. As discussed above, in the example of FIG. 3a, virtual images are formed by the convex lens, in this case, the image distance l' in the above formula (1) is negative, so the above formula (1) is modified as:

$$\frac{1}{l} - \frac{1}{l'} = \frac{1}{f'}. \quad (4)$$

Figure 4A:
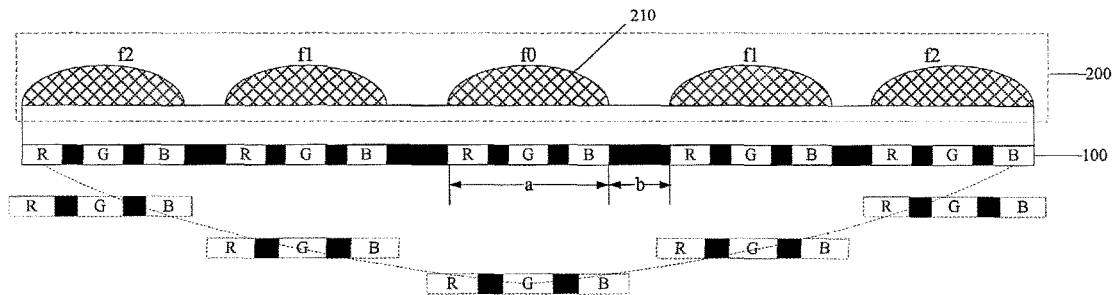
FIG. 4a is a structural schematic diagram of a display panel realizing rear curved surface display according to another embodiment of the disclosure.

Since the focal length f' of the convex lens 210 increases as the distance between the convex lens 210 and the central symmetrical axis increases, it can be understood from the above formulas (3) and (4) that the imaging magnification of each pixel RGB decreases as the distance between the pixel RGB and the central symmetrical axis increases. That is, the imaging magnification at the center is the largest, and the imaging magnification at the edge is the smallest. In this way, the phenomenon of overlapping images is the most significant at the center of the flat display panel, and is the lightest at the edges of the flat display panel. Therefore, as shown in FIG. 4a, in the direction perpendicular to the central symmetrical axis, the ratio of the width of the pixel to the width of the black matrix next to the pixel (i.e., a:b) increases as the distance between the pixel RGB and the central symmetrical axis increases. Specifically, the width a of the pixel RGB in the direction perpendicular to the central symmetrical axis increases as the distance between the pixel RGB and the central symmetrical axis increases. Alternatively, as shown in FIG. 4a, the width b of the black matrix next to the pixel RGB in the direction perpendicular to the central symmetrical axis decreases as the distance between the pixel RGB and the central symmetrical axis increases.

Figure 4B:
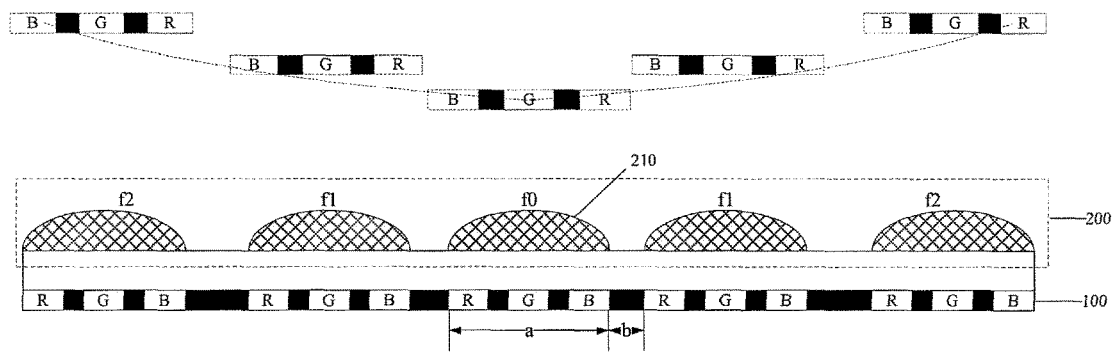
FIG. 4b is a structural schematic diagram of a display panel realizing front curved surface display according to another embodiment of the disclosure.

As shown in FIG. 3b, the object distance l between the convex lens array 200 and the flat display panel 100 is larger than the focal lengths f' of the convex lenses 210. Since the focal length f' of the convex lens 210 increases as the distance between the convex lens 210 and the central symmetrical axis increases, it can be understood from the above formula (3) that the imaging magnification of each pixel RGB increases as the distance between the pixel RGB and the central symmetrical axis increases. That is, the imaging magnification at the center is the smallest, and the imaging magnification at the edge is the largest. In this way, the phenomenon of overlapping images is the lightest at the center of the flat display panel, and is the most significant at the edges of the flat display panel. Therefore, as shown in FIG. 4b, in the direction perpendicular to the central symmetrical axis, the ratio of the width of the pixel to the width of the black matrix next to the pixel (i.e., a:b) decreases as the distance between the pixel RGB and the central symmetrical axis increases. Specifically, the width a of the pixel RGB in the direction perpendicular to the central symmetrical axis decreases as the distance between the pixel RGB and the central symmetrical axis increases. Alternatively, as shown in FIG. 4b, the width b of the black matrix next to the pixel RGB in the direction perpendicular to the central symmetrical axis increases as the distance between the pixel RGB and the central symmetrical axis increases.

With the above structure, the magnified virtual images of the pixels RGB do not overlap with each other, or the overlapping portion is as little as possible, so as to enhance the picture quality of the display panel.

Figure 5A:
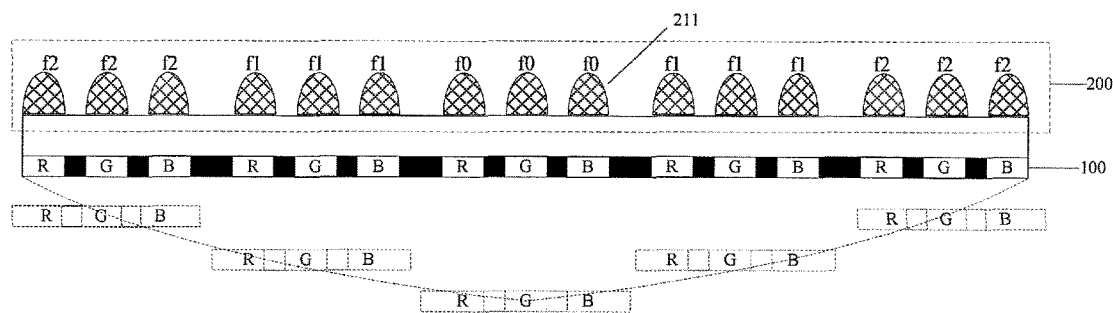
FIG. 5a is a structural schematic diagram of a display panel realizing rear curved surface display according to yet another embodiment of the disclosure.
Figure 5B:
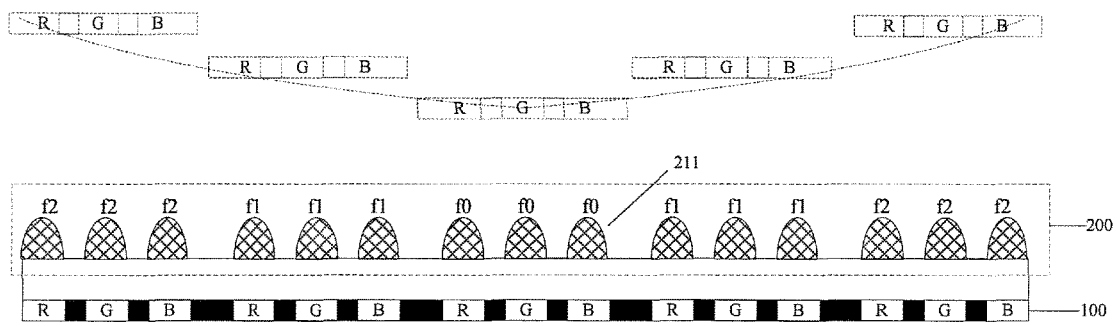
FIG. 5b is a structural schematic diagram of a display panel realizing front curved surface display according to yet another embodiment of the disclosure.

Mode 2: arranging sub-convex lenses on the scale of sub-pixels. As shown in FIG. 5a and FIG. 5b, each convex lens 210 includes a plurality of sub-convex lenses 211 having the same focal length f', and the plurality of sub-convex lenses 211 are in one-to-one correspondence with a plurality of sub-pixels R, G and B constituting the pixel RGB. In this way, one sub-convex lens 211 corresponds to one sub-pixel R, G or B. The sub-convex lenses 211 corresponding to a pixel RGB have the same focal length. Therefore, the magnified images of the sub-pixels R, G and B in the same pixel RGB will overlap with each other, while the images of adjacent pixels will not overlap with each other or only overlap very little with each other due to the existence of the black matrix (BM). Overlapping of the magnified images of the sub-pixels R, G and B will not affect the display effect, but instead it is conducive to the color modulation of the picture quality and indirectly enhances the aperture ratio of the display pixel.

Figure 6A:
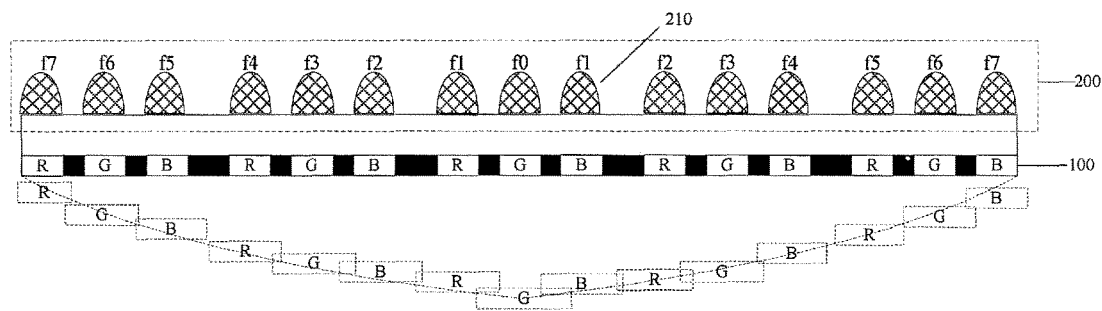
FIG. 6a is a structural schematic diagram of a display panel realizing rear curved surface display according to still another embodiment of the disclosure.
Figure 6B:
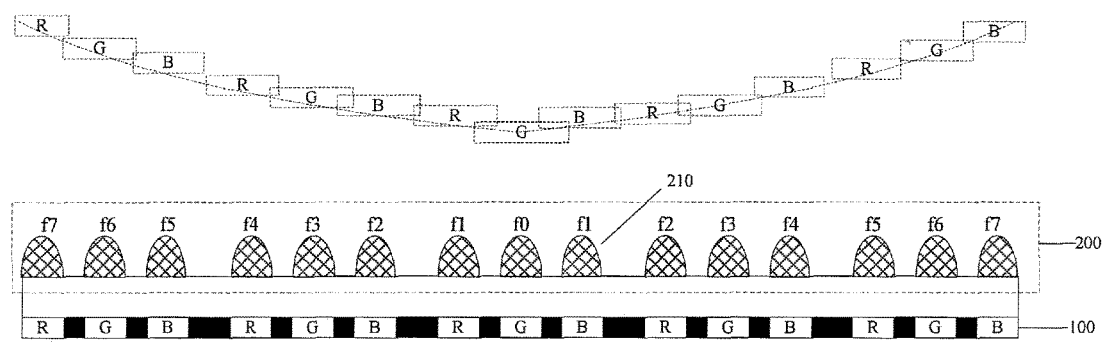
FIG. 6b is a structural schematic diagram of a display panel realizing front curved surface display according to still another embodiment of the disclosure.

Mode 3: arranging a convex lens for each sub-pixel. As shown in FIG. 6a and FIG. 6b, a plurality of sub-pixels R, G and B constituting the pixel RGB in the flat display panel 100 are in one-to-one correspondence with the convex lenses 210 in the array of convex lenses 200, i.e., one convex lens 210 corresponds to one sub-pixel R, G or B. The focal length of the convex lens 210 varies as the distance between the lens 210 and the central symmetrical axis changes. Therefore, the magnified images of the sub-pixels R, G and B in the same pixel RGB will overlap with each other, while the images of adjacent pixels will not overlap with each other or only overlap very little with each other due to the existence of the black matrix (BM).

The term "trajectory of images of the pixels" mentioned herein refers to a profile of a connection line of the images of the pixels, which images of the pixels are generated through the convex lenses of the array of convex lenses imaging the pixels of the flat display panel when it operates. Examples of the trajectory of images of the pixels are shown as dotted curves in FIG. 3a to FIG. 6b.

In an exemplary embodiment, in the display panel provided by the present disclosure, for convenience of manufacture, as shown in FIG. 1a, the convex lens 210 in the convex lens array 200 can be a planoconvex lens 210, i.e., a lens with a flat surface and a convex surface.

Further, in the display panel provided by the embodiment of the present disclosure, in order to obtain a good imaging effect of the convex lens array 200, as shown in FIG. 1a, the convex surface of each planoconvex lens is away from the light exit surface of the flat display panel 100.

Further, in the display panel provided by the embodiment of the present disclosure, the planoconvex lens is a cylindrical convex lens or a circular convex lens. In particular, a good imaging effect can be obtained by using circular convex lenses.

Moreover, in the display panel provided by the embodiment of the present disclosure, as can be seen from the above formula (2), a specific radius of curvature r corresponds to a specific focal length f'. In order to obtain different focal lengths f' of the circular convex lenses, it is necessary to set the radius of curvature for each circular convex lens. Specifically, the arch heights of the circular convex lenses can be set to a constant value, and the apertures of the circular convex lenses (the diameters or radiuses of the cross-sections of the convex lenses) can be set to different values, so as to adjust the radius of curvature. Alternatively, it is also possible to set the apertures of the circular convex lenses to a constant value, and set the arch heights of the circular convex lenses to different values to adjust the radius of curvature. In an exemplary embodiment, for convenience of manufacture, the circular convex lenses are generally arranged closely and the apertures are set to be the same, so that the radius of curvature can be adjusted by adjusting the arch height of the circular convex lens.

In the following, an example is illustrated by a flat display panel of 13.3 inches with 1920×1080 pixels, in which each sub-pixel corresponds to one convex lens, as shown in FIG. 6a and FIG. 6b.

Figure 7:
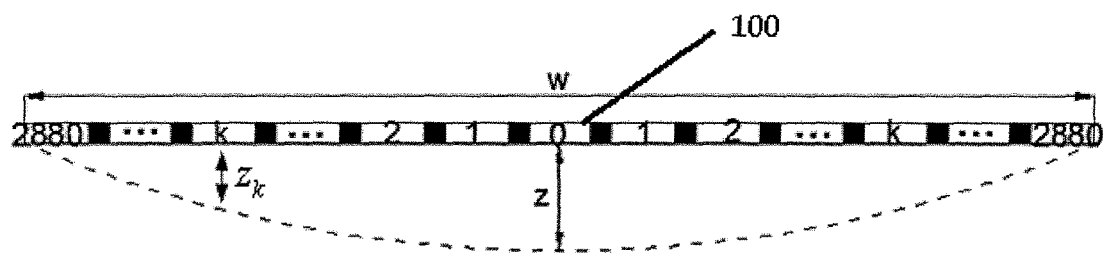
FIG. 7 is an exemplary structural schematic diagram of a display panel realizing rear curved surface display according to an embodiment of the disclosure.
Figure 8:
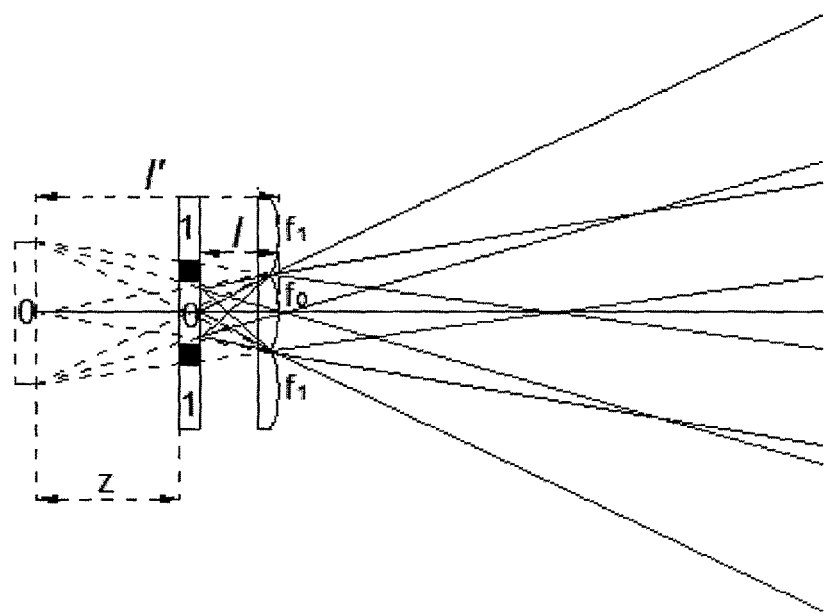
FIG. 8 is a schematic diagram for the principle of a display panel realizing rear curved surface display according to an embodiment of the disclosure.

For the display effect of rear virtual curved surface, as shown in FIG. 7 and FIG. 8, if the position of the center of the virtual curved surface has a rearward distance z from the flat display panel 100, the object distance is l, the image distance l'=l+z. From the formula (1) and formula (2), the focal length $f_0$ and radius of curvature r of the convex lens corresponding to the sub-pixel on the center can be calculated.

For the flat display panel product of 13.3 inches, the width w=297 mm. If a virtual curved surface with a radius of 2000 mm is desired, the center of the virtual curved surface should have a rearward distance z=5 mm from the flat display panel 100. If the object distance l=1 mm (related to the membrane thickness), the image distance l'=6 mm. Taking these parameters into the formula (1), the focal length $f_0$=1.2 mm (the optical symbol should be noted in the formula, the object distance and the image distance are negative). If K9 glass is applied in the convex lens array, the refractive index n=1.5164, thus it can be calculated with the formula (2) that the radius of curvature r=0.62 mm.

For the sub-pixels not on the center of the 13.3 inches flat display panel product, as shown in FIG. 7, the serial number of the sub-pixel can be set as k (k is an integer and k∈[0, 2880]). The virtual image of the sub-pixel formed by the corresponding convex lens has a rearward distance from the original sub-pixel:

$$z_k = z \cdot \frac{2880-k}{2880}.$$

With the combination of formula (1) and formula (2), the focal length $f_k$ and the radius of curvature $r_k$ can be calculated for the convex lens corresponding to the sub-pixel. For example: z=5 mm, l=1 mm, and n=1.5164. If k=1440, $f_{1440}$=1.4 mm, and $r_{1440}$=0.723 mm.

Figure 9:
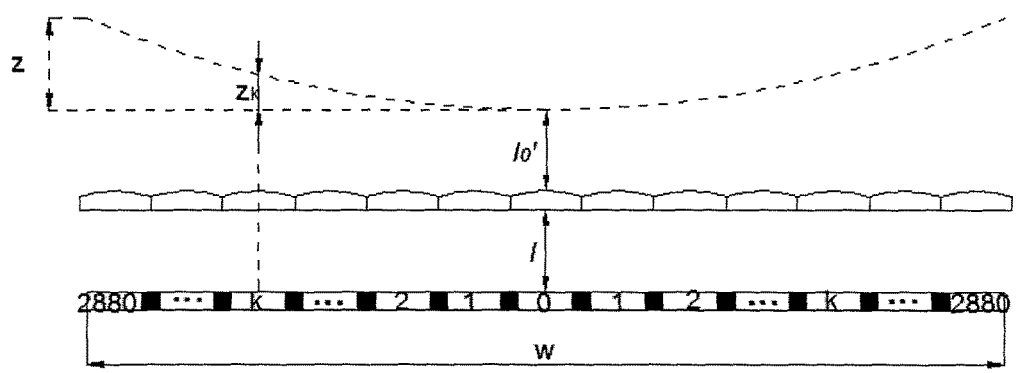
FIG. 9 is an exemplary structural schematic diagram of a display panel realizing front curved surface display according to an embodiment of the disclosure.

For the display effect of front virtual curved surface, as shown in FIG. 9, the position of the edge of the virtual curved surface has an axial distance z from the center of the virtual curved surface, the object distance is l, and the image distance of the center position is $l_0'$, then the image distance of the edge position is $l_z'=l_0'+z$. From the formula (1) and formula (2), the focal length $f_0$ and radius of curvature r of the convex lens corresponding to the sub-pixel on the center can be calculated, the focal length $f_z'$ and radius of curvature $r_z$ of the convex lens corresponding to the sub-pixel on the edge can also be calculated.

For the flat display panel product of 13.3 inches, the width w=297 mm. If a virtual curved surface with a radius of 2000 mm is desired, the edge of the virtual curved surface should have a axial distance z=5 mm with respect to the center of the virtual curved surface. If the object distance l=4 mm (related to the membrane thickness, ensuring that the object distance is larger than the focal length), to maintain the image size of the sub-pixel on the center, the image distance $l_0'$=4 mm. Taking these parameters into the formula (1), the focal length $f_0$=2 mm (the optical symbol should be noted in the formula, the object distance is negative and the image distance is positive). If K9 glass is applied in the convex lens array, the refractive index n=1.5164, thus it can be calculated with the formula (2) that the radius of curvature r=1.033 mm. For the convex lens corresponding to the sub-pixel on the edge, the object distance l=4 mm, the image distance $l_z'=l_0'+z$=9 mm. Taking these parameters into the formula (1) and formula (2), $f_z'$=2.77 mm, and $r_z$=1.43 mm.

For the sub-pixels on other positions of the 13.3 inches flat display panel product, as shown in FIG. 9, the serial number of the sub-pixel can be set as k (k is an integer and k∈[0, 2880]). The virtual image of the sub-pixel formed by the corresponding convex lens has a rearward distance from the original sub-pixel:

$$z_k = z \cdot \frac{k}{2880}.$$

With the combination of formula (1) and formula (2), the focal length $f_k$ and the radius of curvature $r_k$ can be calculated for the convex lens corresponding to the sub-pixel. For example: z=5 mm, l=4 mm, and n=1.5164. If k=1440, $l_{1400}'$=4 mm+$z_{1400}$=6.5 mm, $f_{1440}$=2.476 mm, and $r_{1440}$=1.279 mm.

Based on the same inventive concept, an embodiment of the present disclosure provides a display device including the above mentioned display panel. The display device can be any product or component with display function, such as mobile phone, tablet computer, TV, display, notebook computer, digital photo frame and navigator. The implementation of the display device can refer to the embodiments of the above mentioned display panel, which will not be repeated herein.

In the display panel provided by the embodiment of the present disclosure, the array of convex lenses is arranged on the light exit surface of the flat display panel, and the imaging principle of the convex lens is applied. The focal lengths of the convex lenses are symmetrically distributed with respect to a center or a vertical central symmetrical axis of the light exit surface. By adjusting the focal lengths of the lenses, the image distances of the pixels in the flat display panel can be various. The images of the pixels are then distributed on a curved surface. A visual effect of a virtual curved surface can be achieved with a flat display panel, improving the effect of visual impact.

Apparently, the person skilled in the art may make various alterations and variations to the disclosure without departing the spirit and scope of the invention. As such, provided that these modifications and variations of the disclosure pertain to the scope of the claims of the invention and their equivalents, the invention is intended to embrace these alterations and variations.

What is claimed is:

1. A display panel comprising: a flat display panel having a plurality of pixels arranged in a matrix, and an array of convex lenses arranged on a light exit surface of the flat display panel, wherein the convex lenses in the array are configured for imaging the plurality of pixels, such that a trajectory of images of the pixels forms a curved surface,
wherein focal lengths of the convex lenses are symmetrically distributed with respect to a vertical central symmetrical axis of the light exit surface; and the focal lengths of the convex lenses having the same distance from the vertical central symmetrical axis are the same.

2. The display panel according to claim 1, wherein the focal length of the convex lens increases with the increase of the distance between the convex lens and the vertical central symmetrical axis.

3. The display panel according to claim 2, wherein the pixels in the flat display panel are in one-to-one correspondence with the convex lenses in the array of convex lenses.

4. The display panel according to claim 2, wherein a plurality of sub-pixels constituting the pixel in the flat display panel are in one-to-one correspondence with the convex lenses in the array of convex lenses.

5. The display panel according to claim 3, wherein each of the pixels is encircled by a black matrix, wherein an object distance between the array of convex lenses and the flat display panel is smaller than the focal lengths of the convex lenses, wherein in a direction perpendicular to the vertical central symmetrical axis, a ratio of a width of the pixel to a width of the black matrix next to the pixel increases with the increase of the distance between the convex lens and the vertical central symmetrical axis.

6. The display panel according to claim 5, wherein in the direction perpendicular to the vertical central symmetrical axis, the width of the pixel increases with the increase of the distance between the convex lens and the vertical central symmetrical axis.

7. The display panel according to claim 5, wherein in the direction perpendicular to the vertical central symmetrical axis, the width of the black matrix between the pixels decreases with the increase of the distance between the convex lens and the vertical central symmetrical axis.

8. The display panel according to claim 3, wherein each convex lens comprises a plurality of sub-convex lenses having the same focal length, and the plurality of sub-convex lenses are in one-to-one correspondence with a plurality of sub-pixels constituting the pixel.

9. The display panel according to claim 3, wherein each of the pixels is encircled by a black matrix, wherein an object distance between the array of convex lenses and the flat display panel is larger than the focal lengths of the convex lenses,
wherein in a direction perpendicular to the vertical central symmetrical axis, a ratio of a width of the pixel to a width of a black matrix next to the pixel decreases with the increase of the distance between the convex lens and the vertical central symmetrical axis.

10. The display panel according to claim 9, wherein in a direction perpendicular to the vertical central symmetrical axis, the width of the pixel decreases with the increase of the distance between the convex lens and the vertical central symmetrical axis.

11. The display panel according to claim 9, wherein the width of the black matrix between the pixels increases with the increase of the distance between the convex lens and the vertical central symmetrical axis.

12. The display panel according to claim 1, wherein the convex lens is a planoconvex lens, and the planoconvex lenses are arranged closely with each other and have the same aperture.

13. The display panel according to claim 12, wherein a convex surface of each planoconvex lens is away from the light exit surface of the flat display panel, and the planoconvex lens is a cylindrical convex lens or a circular convex lens.

14. The display panel according to claim 1, wherein the flat display panel is a liquid crystal display panel, an electroluminescence display panel, a plasma display panel or an electronic paper.

15. A display device, comprising the display panel according to claim 1.

16. The display device according to claim 15, wherein the focal length of the convex lens increases with the increase of the distance between the convex lens and the vertical central symmetrical axis.

17. The display device according to claim 16, wherein the pixels in the flat display panel are in one-to-one correspondence with the convex lenses in the array of convex lenses.

* * * * *